United States Patent
Buttolo et al.

(10) Patent No.: US 11,332,122 B2
(45) Date of Patent: May 17, 2022

(54) VEHICLE SENSOR SYSTEM AND METHODS OF USE

(71) Applicant: Ford Global Technologies, LLC, Dearborn, MI (US)

(72) Inventors: Pietro Buttolo, Dearborn Heights, MI (US); Stuart C. Salter, White Lake, MI (US); David Brian Glickman, Southfield, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 451 days.

(21) Appl. No.: 16/524,780

(22) Filed: Jul. 29, 2019

(65) Prior Publication Data
US 2021/0031753 A1    Feb. 4, 2021

(51) Int. Cl.
*B60W 30/06*    (2006.01)
*B62D 25/20*    (2006.01)
*G01V 3/08*    (2006.01)
*B60R 19/48*    (2006.01)

(52) U.S. Cl.
CPC ........... *B60W 30/06* (2013.01); *B60R 19/483* (2013.01); *B62D 25/2072* (2013.01); *G01V 3/088* (2013.01); *B60W 2420/24* (2013.01); *B60W 2554/00* (2020.02)

(58) Field of Classification Search
CPC ............. B60W 30/06; B60W 2420/24; B60W 2554/00; B60R 19/483; B60R 16/02; B62D 25/2072; G01V 3/088; G01V 3/08
See application file for complete search history.

(56) References Cited

U.S. PATENT DOCUMENTS

| | | | |
|---|---|---|---|
| 6,348,862 B1* | 2/2002 | McDonnell | B60N 2/002 180/272 |
| 8,058,993 B2 | 11/2011 | Hammerschmidt et al. | |
| 8,779,782 B2 | 7/2014 | Aubry et al. | |
| 9,953,476 B2* | 4/2018 | Murphy | G07C 9/28 |
| 2010/0079283 A1* | 4/2010 | Hammerschmidt | H03K 17/955 340/562 |
| 2018/0056985 A1* | 3/2018 | Coulter | B60W 30/146 |
| 2021/0024141 A1* | 1/2021 | Salter | B60R 19/48 |

FOREIGN PATENT DOCUMENTS

| | | |
|---|---|---|
| DE | 102010001264 | 7/2011 |
| FR | 3033148 | 9/2016 |
| JP | 2017106781 | 6/2017 |

* cited by examiner

*Primary Examiner* — Richard M Camby
(74) *Attorney, Agent, or Firm* — Vichit Chea; Carlson, Gaskey & Olds, P.C.

(57) ABSTRACT

A vehicle assembly includes a sensor system of a bumper or a skid plate. The sensor system includes a plurality of first sensors and at least one second sensor. The sensor system emits a first electrical field from each of the first sensors when the plurality of first sensors are active and the at least one second sensor is inactive. The sensor system emits a second electrical field when the plurality of first sensors are active and the at least one second sensor is active. The first electrical field projects a first distance from the skid plate. The second electrical field projects a longer, second distance from the skid plate.

19 Claims, 8 Drawing Sheets

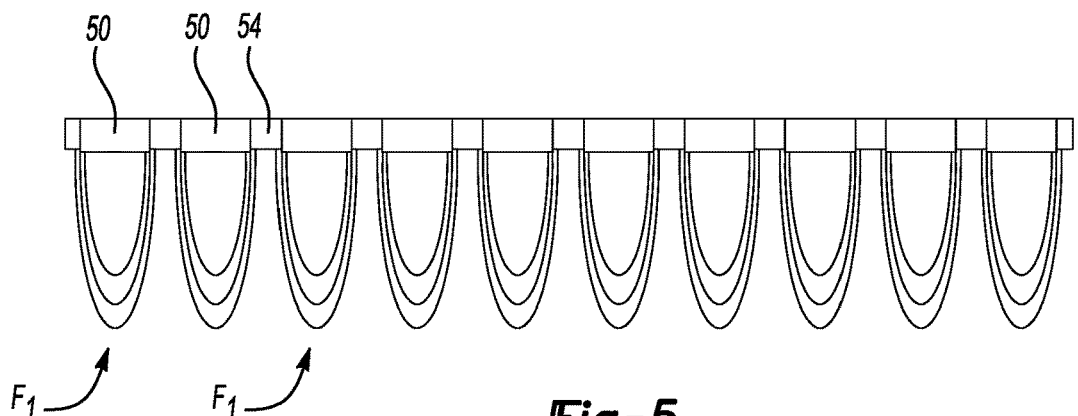
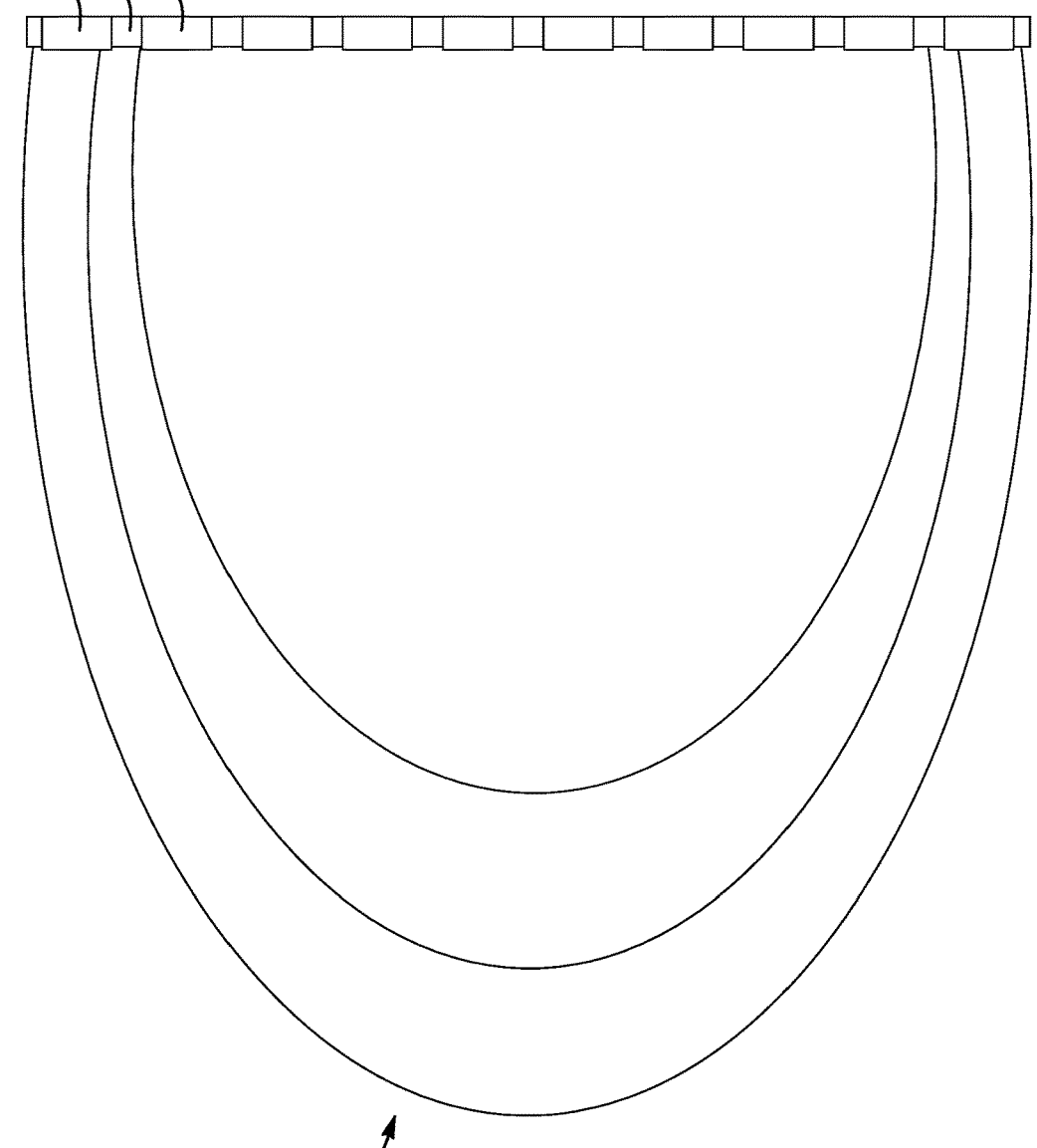

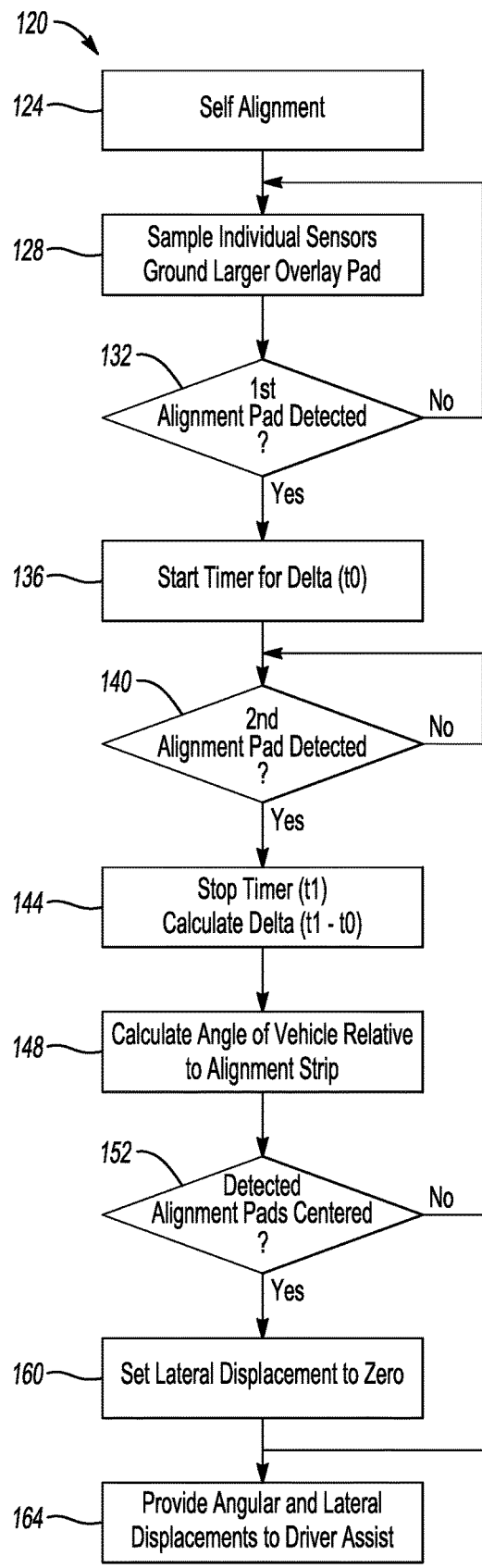
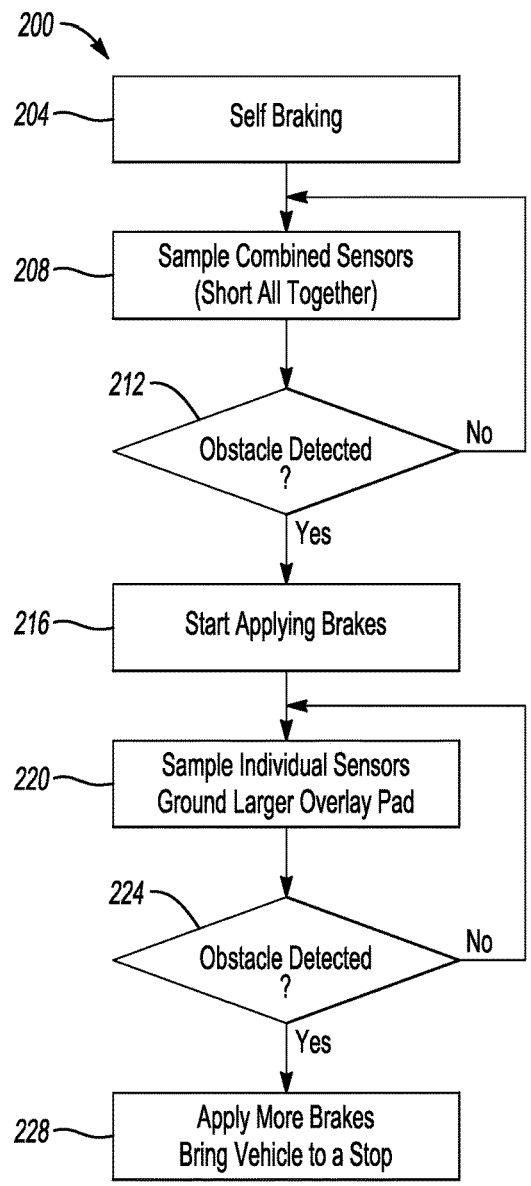
Fig-11
Fig-13

VEHICLE SENSOR SYSTEM AND METHODS OF USE

TECHNICAL FIELD

This disclosure relates generally to a sensor system for a vehicle and, more particularly, to a sensor system that can emit different electrical fields.

BACKGROUND

A vehicle can include a skid plate vertically beneath a bumper assembly. The skid plate can extend beneath an underbody of the vehicle. The skid plate can protect the underbody of the vehicle.

SUMMARY

A vehicle assembly according to an exemplary aspect of the present disclosure includes, among other things, a sensor system of a bumper or a skid plate. The sensor system includes first sensors and at least one second sensor. The sensor system emits a first electrical field from each of the first sensors when the first sensors are active and the second sensor is inactive. The sensor system emits a second electrical field when the first sensors are active and the second sensor is active. The first electrical field projects a first distance from the skid plate. The second electrical field projects a greater, second distance from the skid plate.

In a further embodiment of the foregoing assembly, each of the first sensors is spaced horizontally a distance from the remaining first sensors.

In a further embodiment of any of the foregoing assemblies, at least a portion of the second sensor is disposed horizontally between each of the first sensors.

In a further embodiment of any of the foregoing assemblies, the second sensor extends about a perimeter of each of the first sensors.

In a further embodiment of any of the foregoing assemblies, the second sensor is shorted when inactive.

A further embodiment of any of the foregoing assemblies includes a switch pack configured to short the second sensor to ground to inactivate the second sensor. The switch pack is further configured to short the first sensors together with the second sensor when the plurality of first sensors are active and the second sensor is active.

A further embodiment of any of the foregoing assemblies includes a controller module configured to align a vehicle in response to signals from the first sensors. The signals change based on the positions of the first sensors relative to conductive elements that are outside the vehicle and disposed along a conductive element axis.

In a further embodiment of any of the foregoing assemblies, the conductive elements are disposed within a target that is placed on a floor of a parking area.

In a further embodiment of any of the foregoing assemblies, the aligning includes aligning the vehicle such that a longitudinal axis of the vehicle is perpendicular to the conductive element axis.

In a further embodiment of any of the foregoing assemblies, the aligning further includes aligning the vehicle laterally relative to the conductive elements.

A further embodiment of any of the foregoing assemblies includes the skid plate and the sensor system within the skid plate.

A further embodiment of any of the foregoing assemblies includes the bumper and the sensor system within the bumper.

A method of vehicle sensing according to another exemplary aspect of the present disclosure includes, among other things, under first operating conditions of a vehicle, emitting at least one first electrical field from a sensor system within a skid plate or a bumper of the vehicle. Under second operating conditions of the vehicle, the method emits a second electrical field from the sensor system. The first electrical field projects a first distance from the skid plate. The second electrical field projecting a longer, second distance from the skid plate.

Another embodiment of the foregoing method includes activating a plurality of first sensors of the sensor system while a second sensor of the sensor system is inactive to emit a first electrical field from each of the first sensors, and activating the first sensors and the second sensor to emit a second capacitive field.

A further embodiment of any of the foregoing methods includes, under the first operating conditions, aligning the vehicle in response to signals from the first sensors, the signals changing based on the positions of the first sensors relative to conductive elements that are outside the vehicle and disposed along a conductive element axis.

In another exemplary embodiment of any of the foregoing methods, the conductive elements are disposed within a target that is placed on a floor of a parking area.

In another exemplary embodiment of any of the foregoing methods, the aligning includes aligning the vehicle such that a longitudinal axis of the vehicle is nominally perpendicular to the conductive element axis and aligning the vehicle laterally relative to the conductive elements.

In another exemplary embodiment of any of the foregoing methods, the aligning is autonomous.

Another exemplary embodiment of any of the foregoing methods includes detecting an object using the second electrical field, moving the vehicle closer to the object, and then detecting the object using the first electrical field.

Another exemplary embodiment of any of the foregoing methods includes emitting the at least one first electrical field and the second electrical field from the skid plate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 illustrates a plurality of first electrical fields emanating from the skid plate.

FIG. 6 illustrates a second electrical field emanating from the skid plate.

FIG. 11 illustrates the flow of an example method of self-aligning the vehicle of FIG. 1 relative to the target of FIG. 8.

FIG. 13 illustrates the flow of an example method of self-braking the vehicle of FIG. 1 relative to the target of FIG. 8.

DETAILED DESCRIPTION

This disclosure details a sensor system for a vehicle and methods for using the sensor system. The sensor system is a capacitive sensor system.

Figure 1:
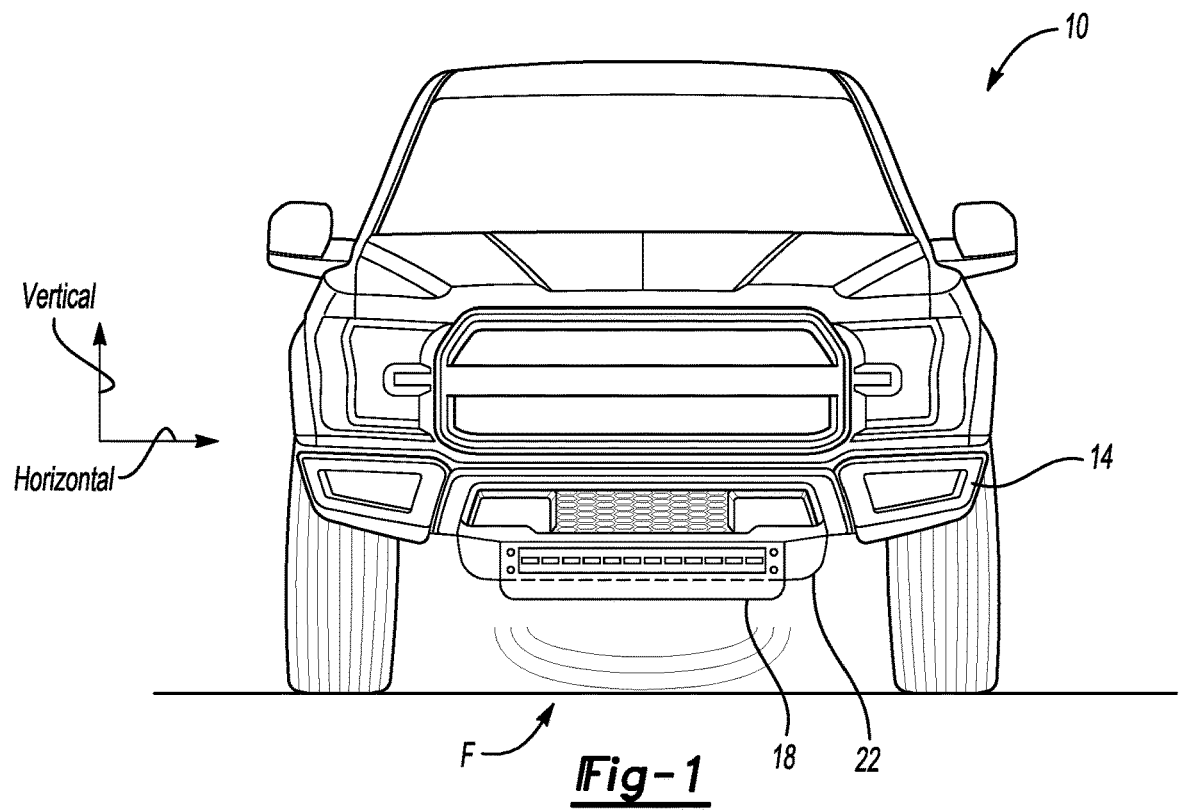
FIG. 1 illustrates a front view of a vehicle incorporating a skid plate according to an exemplary aspect of the present disclosure.
Figure 2:
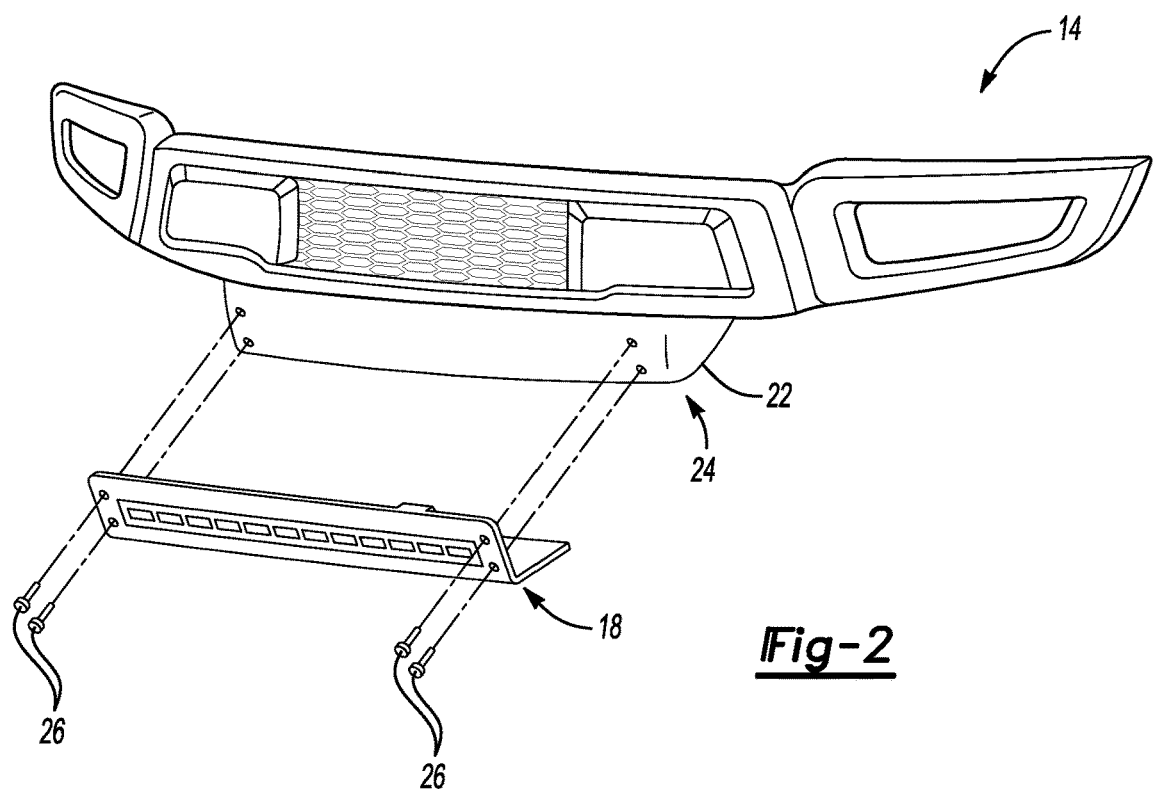
FIG. 2 illustrates a perspective view of the skid plate of FIG. 1 and a bumper assembly.
Figure 3:
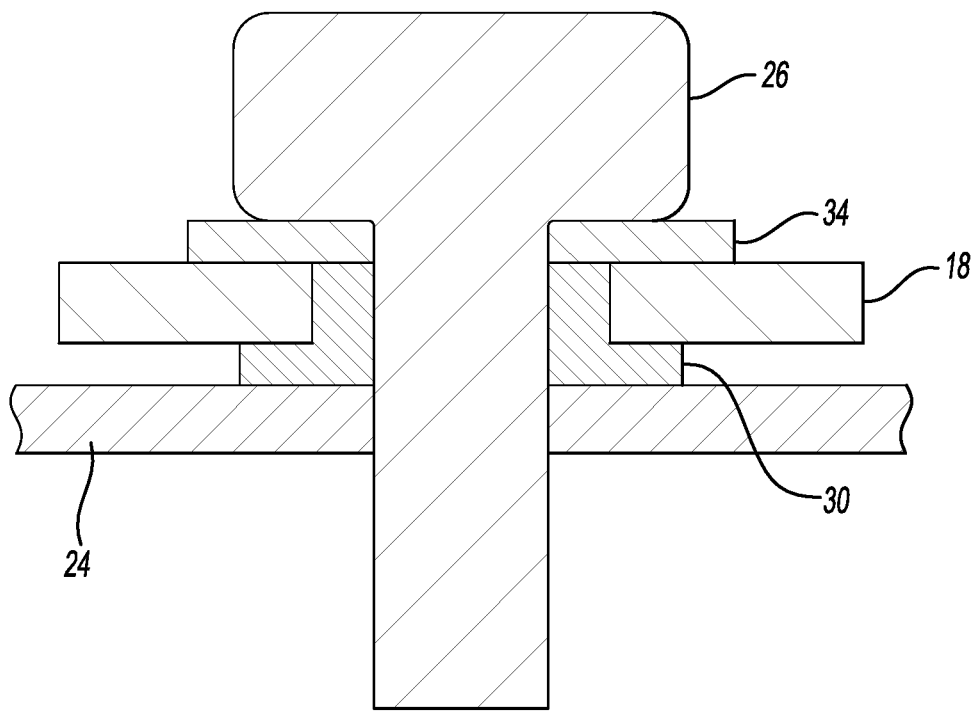
FIG. 3 illustrates a section view of a fastener attaching the skid plate to the vehicle of FIG. 1.

With reference to FIGS. 1-3, a vehicle 10 includes a bumper assembly 14 and a skid plate 18. The bumper assembly 14 is a front bumper assembly in this example. The skid plate 18 is vertically below at least a portion of the bumper assembly 14. For purposes of this disclosure, vertical is with reference to ground and a general orientation of the vehicle 10 during operation.

The skid plate 18 can protect areas of the vehicle 10, such as an underbody 22 of the vehicle 10. For example, if the vehicle 10 is driven over a rocky area, the skid plate 18 can block rocks from directly contacting and damaging the underbody 22 of the vehicle 10. At the front of the vehicle 10, a portion of the skid plate 18 extends vertically below the other structures of the vehicle 10 to provide a protective barrier.

The skid plate 18 can be attached to a body structure 24 of the vehicle 10 with a plurality of mechanical fasteners 26, here bolts. In another example, the skid plate 18 could be attached via arrow-head type fasteners or another type of fastener.

In the exemplary embodiment, the mechanical fasteners 26 extend through an isolating compression limiter 30 and an insulating spacer 34, which sandwich a portion of the skid plate 18. The compression limiter 30 and insulating spacer 34 electrically isolate the skid plate 18 from the body structure 24 and the bumper assembly 14.

Figure 4:
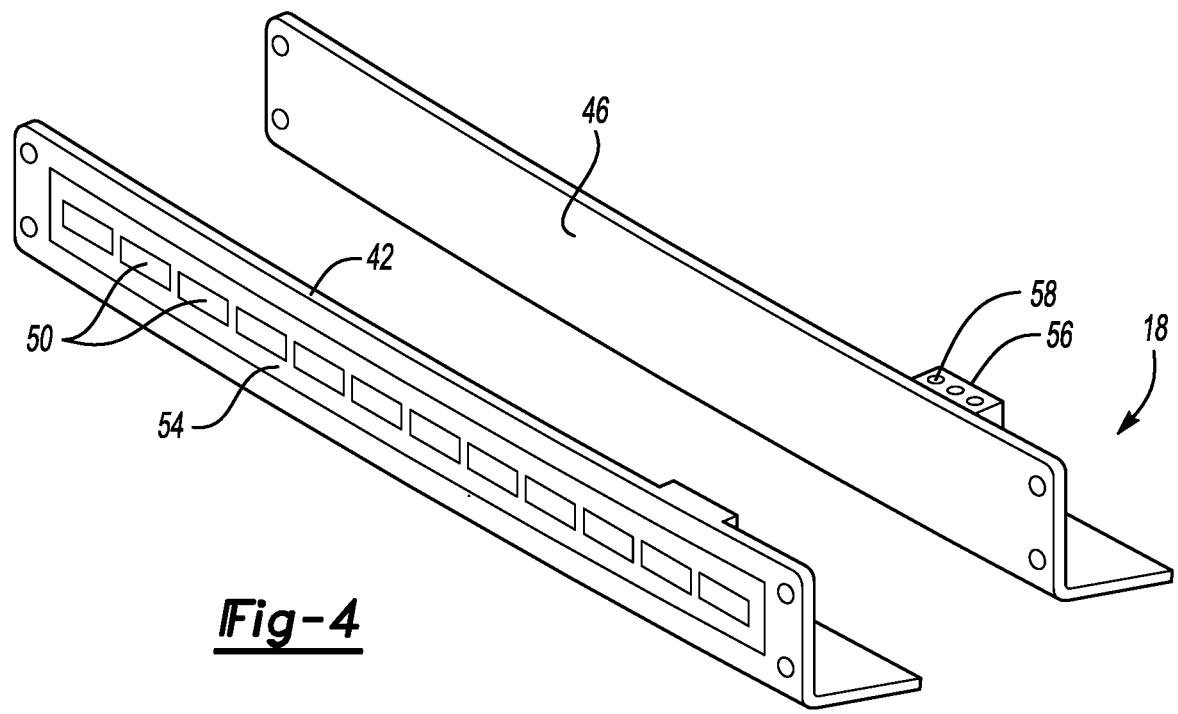
FIG. 4 illustrates a close-up expanded view of the skid plate.

With reference now to FIG. 4, in the exemplary embodiment, the skid plate 18 includes a conductive coating 42 or primer applied to a base substrate 46. In this example, the conductive coating 42 is exposed. In another example, the conductive coating 42 can be covered with a molded-in-color decorative skin to encapsulate the conductive coating 42 and seal the conductive coating 42 between the base substrate 46 and the decorative skin. The decorative skin could be, for example a non-conductive thermoplastic polyolefin. The base substrate 46 can be a polymer-based material.

The conductive coating 42 can include can include a plurality of first sensors 50 of a capacitive sensor system, and at least one second sensor 54 of the capacitive sensor system. The plurality of first sensors 50 can be electrically activated independently from the at least one second sensor 54. In some examples, the first sensors 50 and at least one second sensor 54 are sprayed or painted on to base substrate 46. As known, capacitive sensors can be utilized to detect conductive objects or objects that have a dielectric different than air.

In the exemplary embodiment, the first sensors 50 of the conductive coating 42 can each be selectively activated. Also, the second sensor 54 can be selectively activated. An active ground can extend about a periphery of the conductive coating 42, i.e., about the conductive coating 42. The active ground and the conductive coating 42 can be covered by the decorative skin to seal the active ground and conductive coating 42 within the skid plate 18.

During operation, a voltage can be applied to the first sensors 50 of the conductive coating 42 while the at least one second sensor 54 is inactive. Activating the first sensors 50 while the at least one second sensor 54 is inactive causes the sensor system to emit an electrical field F (FIG. 1) from each of the first sensors 50 as shown in FIG. 5. Depending on the orientation of the skid plate 18 and the conductive coating 42, the electrical fields $F_1$ can propagate vertically downward, horizontally forward from the vehicle 10, or both.

During operation a voltage can instead be applied to both the first sensors 50 and the at least one second sensor 54 of the conductive coating 42. Activating both the first sensors 50 and the at least one second sensor 54 causes the sensor system to emit a second electrical field $F_2$ from the conductive coating 42 as shown in FIG. 6. Depending on the orientation of the skid plate 18 and the conductive coating 42, the second electrical field $F_2$ can propagate vertically downward, horizontally forward from the vehicle 10, or both.

The first electrical fields $F_1$ project a first distance from the skid plate 18, and the second electrical field $F_2$ projects a longer, second distance from the skid plate 18. The first electrical fields $F_1$ are isolated, focused, narrow, and shorter range than the second electrical field $F_2$. The second electrical field $F_2$ protrudes further out than the first electrical field $F_1$, but loses some resolution when compared to the first electrical fields $F_1$. That is, the second electrical field $F_2$ is less sensitive to smaller objects than the first electrical fields $F_1$.

A capacitive module 56 can be secured to a backside of the skid plate 18 and connected to the conductive coating 42 by, for example, wrapping the conductive coating 42 around to printed circuit board contacts 58 of the capacitive module 56. The capacitive module 56 can include a controller module that alters the voltage applied to the conductive coating 42 and provides an output signal indicating an object or target's position relative to the vehicle 10.

In another example, the conductive coating 42 separate from the base substrate 46 is not required and the skid plate 18 incorporates a graphene-infused material to provide the first sensors and second sensor of the capacitive sensor system. In the graphene-infused embodiment, the graphene provides the conductivity necessary for the capacitive sensor system. The graphene-infused material could include regions that are isolated from each other to provide the first sensors separate from the second sensor.

Figure 7:
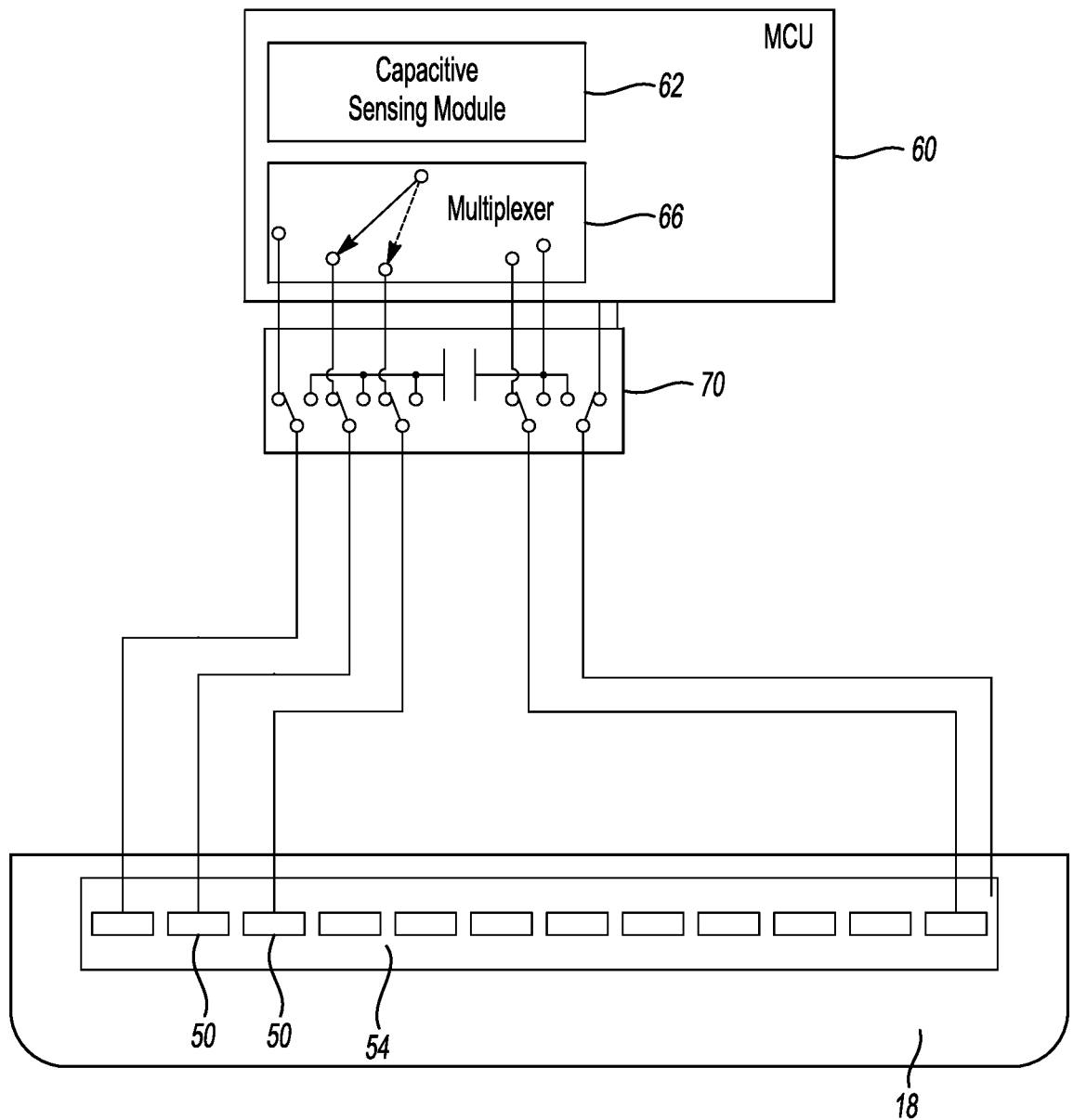
FIG. 7 illustrates a front view of the skid plate and a partially schematic view of other portions of a sensor system.

Referring now to FIG. 7, the sensing system in the exemplary embodiment further includes a microcontroller unit (MCU) 60 having a capacitive sensing module 62 and a multiplexer 66, and a switch pack 70. The multiplexer 66 is operably coupled to the first sensors 50 and the second sensor 54. The switch pack 70 is operably coupled to the multiplexer 66 of the MCU 60.

To activate the first sensors 50 while the second sensor 54 is inactive, switches within the switch pack 70 adjust so a voltage can be applied to each of the first sensors 50 to activate the first sensors 50. This enables the sensor system to emit the first electrical field from each of the first sensors 50. The switch pack 70 is also adjusted so that output signals from each of the first sensors 50 can be communicated back to the multiplexer 66. Further the switch pack 70 is adjusted so that the second sensor 54 is shorted to ground.

To activate the first sensors 50 and the second sensor 54, switches within the switch pack 70 adjust so a voltage can be applied to each of the first sensors 50 and the second sensor 54. This, effectively, shorts together the first sensors 50 and the second sensor 54 and enables the sensor system to emit the second electrical field $F_2$. The switch pack 70 is also adjusted so that an output signal from the second sensor 54 can be communicated back to the multiplexer 66.

The switch pack 70 is thus configured to short the at least one second sensor 54 to ground to inactivate the at least one second sensor 54. The switch pack 70 is further configured to short the plurality of first sensors 50 together with the at least one second sensor 54 when the plurality of first sensors 50 are active and the at least one second sensor 54 is active.

In the exemplary embodiment, each of the first sensors 50 is spaced horizontally a distance from the remaining first sensors 50. Further, a portion of the second sensor 54 is disposed horizontally between each of the first sensors 50. As shown, in the exemplary embodiment, the at least one second sensor 54 extends about a perimeter of each of the first sensors 50.

FIG. 7 shows twelve first sensors 50 and a single second sensor 54. Other numbers of first sensors 50 and the second sensor 54 could be used in other examples. Further, FIG. 7, for drawing clarity, schematically shows only four of the first sensors 50 coupled to the switch pack 70. The remaining sensors would be, however, coupled to the switch pack 70.

The skid plate 18 can then be used as a proximity sensor system that detects nearby objects based on changes to the first electrical field $F_1$ or the second electrical field $F_2$. The electrical fields $F_1$ and $F_2$ can be utilized to sense a position of an object or other target external to the vehicle 10. A person having skill in this art and the benefit of this disclosure would understand how to apply a voltage to the conductive coating 42 to cause the conductive coating 42 to emit the electrical field $F_1$ or the second electrical field $F_2$.

The skid plate 18 includes the sensor system in this example. In another example, the sensor system, including the first sensors 50 and the at least one second sensor 54 is incorporated into the bumper assembly 14.

Figure 8:
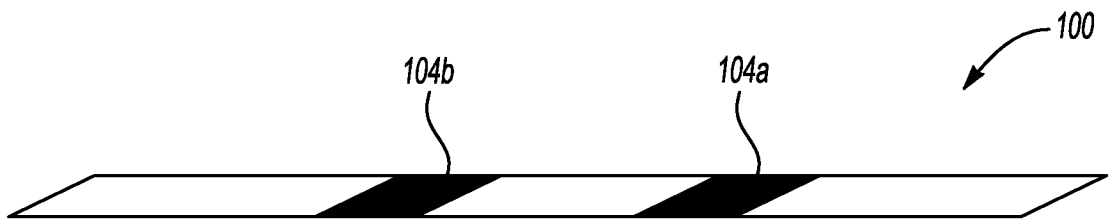
FIG. 8 illustrates a perspective view of a target including portions detectable by the sensor system of FIG. 7.

FIG. 8 shows an example target 100 that can be sensed by the sensor system emitting the first electrical field $F_1$ or the second electrical field $F_2$. The target 100 can be on a floor of a parking area. The exemplary target 100 includes a first conductive element 104a and a second conductive element 104b. The conductive elements 104a and 104b can be metal foil tape. The remaining portions of the target 100 can be painted on the floor. In another example, the conductive elements 104a and 104b are conductive paint and the remaining portions of the target 100 are non-conductive paint.

The target 100 can be disposed within a parking area near a charging station. Based on sensing a position of the target 100, the vehicle 10 of FIG. 1 can position itself. In some examples, the positioning of the vehicle 10 relative to the target 100 is an autonomous positioning. Autonomously positioning the vehicle 10 can be particularly useful when there is not clearance for a driver to enter or exit the vehicle 10, or when the vehicle 10 needs to align itself relative to an inductive charging pad on the ground.

Figure 9A:
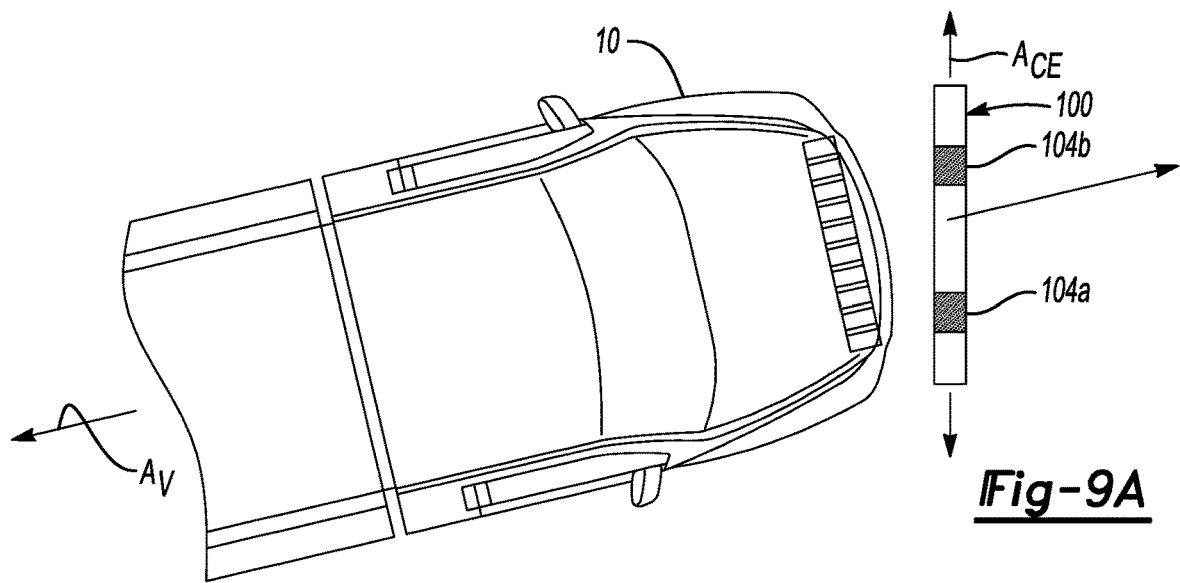
FIGS. 9A-9C illustrate exemplary positions of the vehicle of FIG. 1 relative to the target of FIG. 8.
Figure 9B:
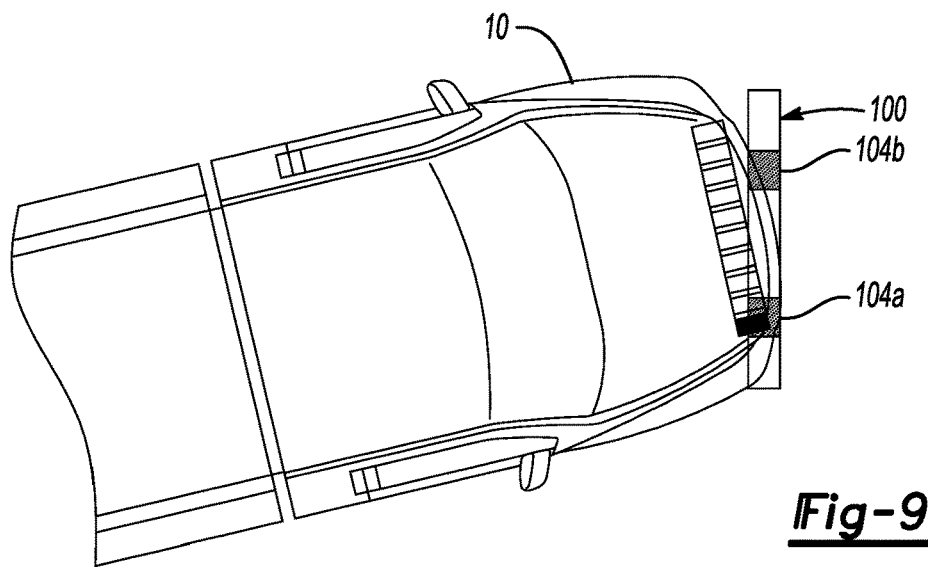

As shown in FIG. 9A, the first electrical fields $F_1$ are emanating from the first sensors 50 of the skid plate 18 while the vehicle 10 is autonomously driven toward target 100. As shown in FIG. 9B, the first sensors 50 on the passenger side of the vehicle 10 initially communicate an output signal indicating that conductive element 104a is nearby. As the vehicle 10 continues to drive, the first sensors 50 closer to the driver side of the vehicle 10 communicate an output signal indicating that the conductive element 104b is nearby.

Figure 9C:
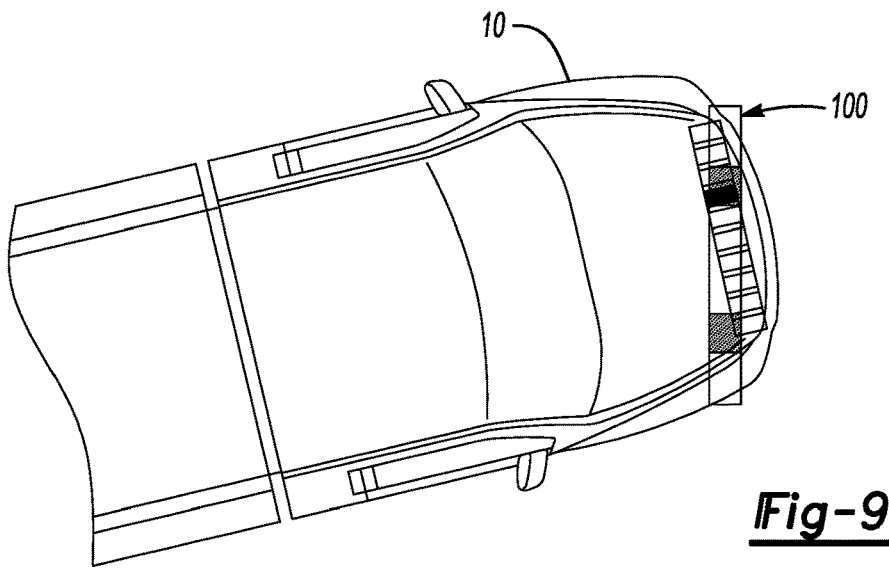

The MCU 60, and particularly the capacitive sensing module 62, aligns the vehicle 10 autonomously in response to signals from the first sensors 50. An Electric Brake Boost (EBB) system and Electronic Power Assisted Steering (EPAS) system could be commanded by the MCU to assist in autonomously aligning the vehicle 10. As described above in connection with FIGS. 9A-9C, the signals from the first sensors 50 change based on the positions of the first sensors 50 relative to the conductive elements 104a and 104b. Generally, the conductive elements 104a and 104b are disposed along a conductive element axis $A_{CE}$ of the target 100. The alignment of the vehicle 10 can continue until a longitudinal axis $A_V$ of the vehicle 10 is substantially perpendicular to the conductive element axis $A_{CE}$ of the target 100.

Figure 10A:
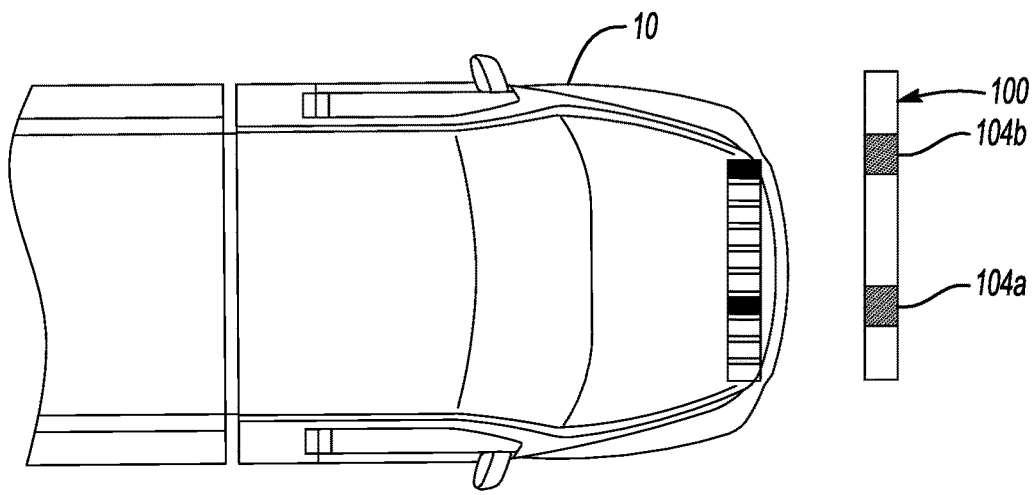
FIGS. 10A-10C illustrate other exemplary positions of the vehicle of FIG. 1 relative to the target of FIG. 8.
Figure 10B:
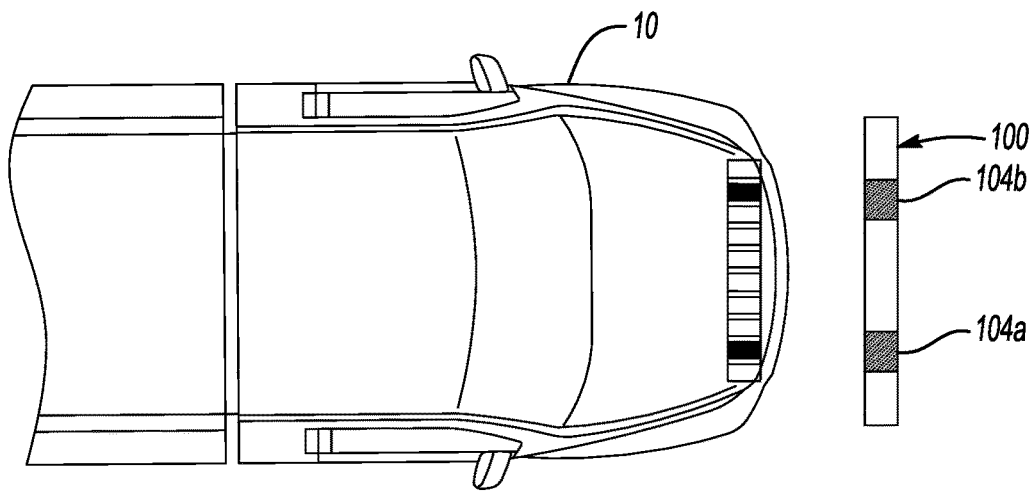
Figure 10C:
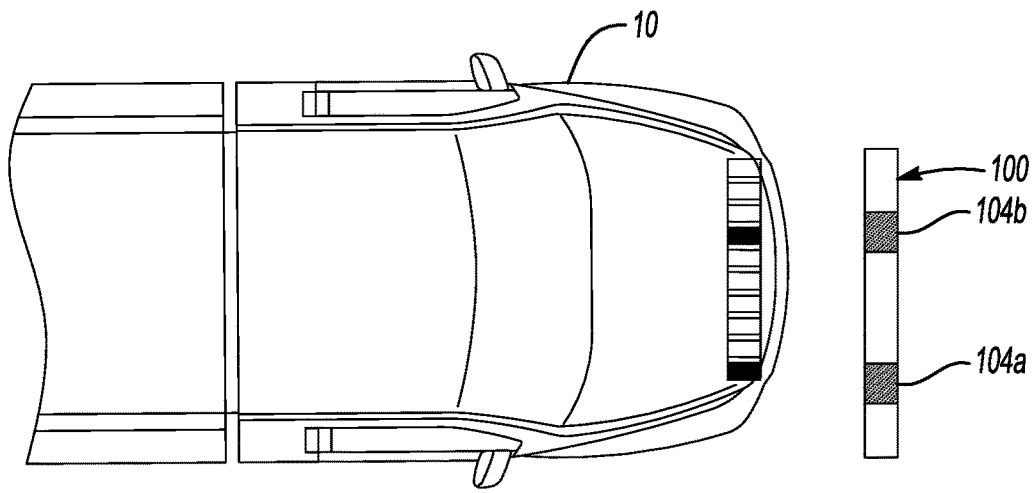

The MCU 60, and particularly the capacitive sensing module 62, can also aligned the vehicle 10 laterally relative to the target 100 as shown in FIGS. 10A-10C. The vehicle 10 can be adjusted until reaching the position of FIG. 10B where the conductive elements 104a and 104b are the same distance from the longitudinal axis $A_V$ of the vehicle 10. Generally, the conductive element axis $A_{CE}$ is perpendicular to the longitudinal axis $A_V$ when the sensor system detects the conductive elements 104a and 104b at the same time.

FIG. 11 shows a flow of an exemplary self-alignment method 120 used by the sensor system having the MCU in connection with the target 100. The method 120 starts at a step 124. Next, at a step 128, the first sensors 50 are activated and the second sensor 54 is grounded. At a step 132, the method 120 then assesses whether the conductive element 104a has been detected. If yes, the method 120 starts a timer at a step 136. If not, the method 120 returns to the step 128.

The method 120 then moves a step 140 where the method 120 assesses whether the conductive element 104b has been detected. If yes, the method 120 moves to the step 144. If not, the method 120 moves back to the step 140.

At the step 144, the method 120 stops the timer and calculates the time difference between the detection of the conductive element 104a and the conductive element 104b. The method 120 then moves to the step 148 where the method uses the time difference to calculate the angle of the vehicle 10 relative to the target 100.

The method 120, at a step 152, assesses whether the vehicle 10 is laterally centered relative to the target 100. If not, the method 120 moves to the step 156, which calculates the lateral displacement from a centered position. If the vehicle 10 is laterally centered, the method 120 sets the lateral displacement value to zero at a step 160. Next, at a step 164, the method 120 communicates the calculated angular and lateral displacement to a driver assist module of the vehicle 10. The vehicle 10 can then be autonomously adjusted into a proper position relative to the target 100. The method 120 could run again after the autonomous adjustment to verify the proper positioning or make further adjustments as required.

Figure 12A:
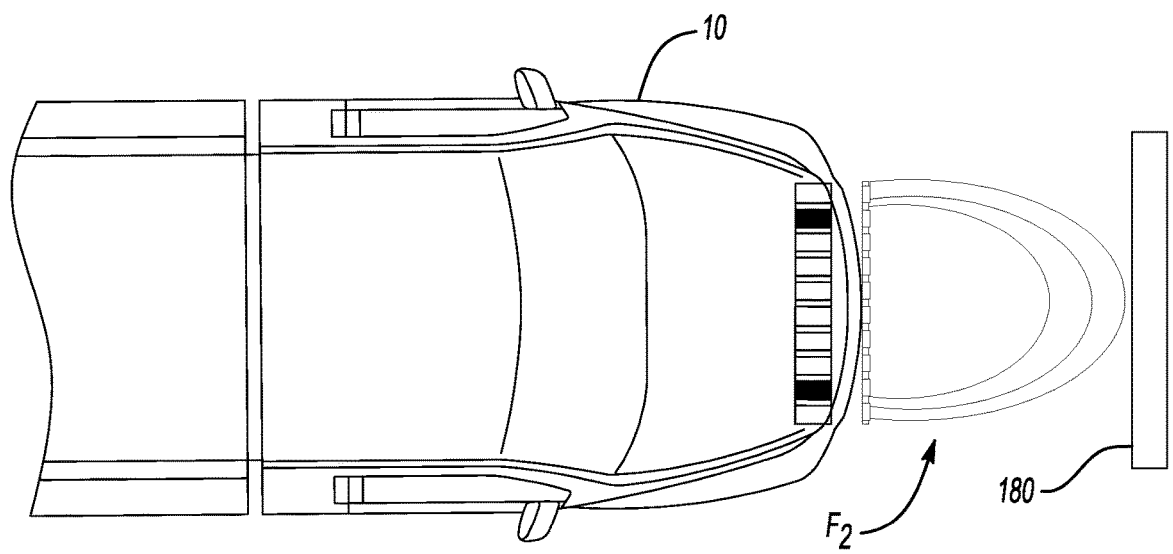
FIGS. 12A-12B illustrate exemplary positions of the vehicle of FIG. 1 relative to an object.

With reference to FIG. 12A, the first sensors 50 and the second sensor 54 can be activated to emit the second electrical field $F_2$ as the vehicle 10 approaches an object 180. The object 180 is a wall in this example. In another examples, the object 180 could be a parked vehicle.

The second electrical field $F_2$ extends further from the vehicle 10 and can detect the object 180 from further away than the first electrical field $F_1$. In response to detecting the object 180, a message could be relayed to an operator of the vehicle 10. The vehicle 10 could instead, or additionally, automatically brake.

Figure 12B:
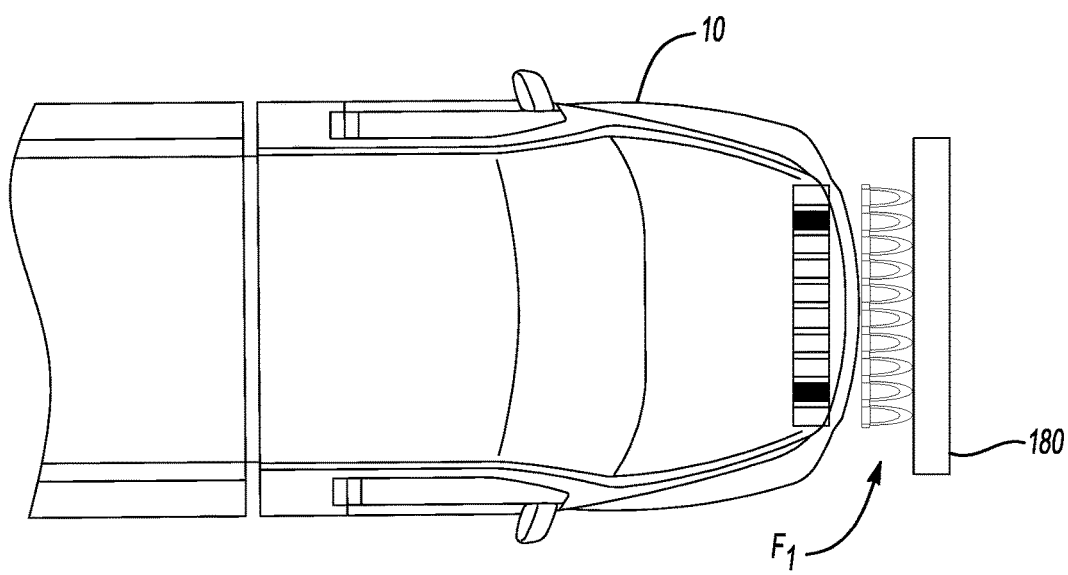

As the vehicle 10 moves closer to the object 180, the second sensor 54 can be deactivated such that the first sensors 50 each emit the first electrical field $F_1$ as shown in FIG. 12B. The distance measurements provided by the first sensors 50 can provide a shorter range confirmation that the vehicle 10 is getting closer to the object 180.

FIG. 13 shows a flow of an exemplary self-braking method 200 used by the sensor system having the MCU in connection with the object 180. The method 200 begins at a step 204. Next, at a step 208, the method 200 shorts together the first sensors 50 and second sensor 54 to emit the first electrical field $F_2$ shown in FIG. 12A.

At a step 212, the method 200 assesses whether an object is detected. If yes, the method 200 transitions to the step 216 where the method 200 causes the brakes to be applied. Then, at a step, the method 200 deactivates the second sensor 54 so that the first sensors 50 each emit the first electrical field $F_1$ as shown in FIG. 12B. Next, at a step 224, the method 200 assesses whether the object is detected by the first electrical field $F_1$. If yes, the braking is increased at a step 228 to stop the vehicle 10.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
a sensor system of a bumper or a skid plate, the sensor system including a plurality of first sensors and at least one second sensor,
the sensor system emitting a first electrical field from each of the first sensors when the plurality of first sensors are active and the at least one second sensor is inactive, the sensor system emitting a second electrical field when the plurality of first sensors are active and the at least one second sensor is active,
the first electrical field projecting a first distance from the skid plate, the second electrical field projecting a greater, second distance from the skid plate.

2. The vehicle assembly of claim 1, wherein each of the first sensors is spaced horizontally a distance from the remaining first sensors.

3. The vehicle assembly of claim 2, wherein at least a portion of the at least one second sensor is disposed horizontally between each of the first sensors.

4. The vehicle assembly of claim 2, wherein the at least one second sensor extends about a perimeter of each of the first sensors.

5. The vehicle assembly of claim 1, wherein the at least one second sensor is shorted when inactive.

6. The vehicle assembly of claim 1, further comprising a switch pack configured to short the at least one second sensor to ground to inactivate the at least one second sensor, the switch pack further configured to short the plurality of first sensors together with the at least one second sensor when the plurality of first sensors are active and the at least one second sensor is active.

7. The vehicle assembly of claim 1, further comprising a controller module configured to align a vehicle in response to signals from the first sensors, the signals changing based on the positions of the first sensors relative to a plurality of conductive elements that are outside the vehicle and disposed along a conductive element axis.

8. The vehicle assembly of claim 7, wherein the plurality of conductive elements are disposed within a target that is placed on a floor of a parking area.

9. The vehicle assembly of claim 7, wherein the aligning includes aligning the vehicle such that a longitudinal axis of the vehicle is perpendicular to the conductive element axis.

10. The vehicle assembly of claim 9, wherein the aligning further includes aligning the vehicle laterally relative to the plurality of conductive elements.

11. The vehicle assembly of claim 1, further comprising the skid plate and the sensor system within the skid plate.

12. The vehicle assembly of claim 1, further comprising the bumper and the sensor system included within the bumper.

13. A method of vehicle sensing, comprising:
under first operating conditions of a vehicle, emitting at least one first electrical field from a sensor system within a skid plate or a bumper of the vehicle;
under second operating conditions of the vehicle, emitting a second electrical field from the sensor system,
the first electrical field projecting a first distance from the skid plate, the second electrical field projecting a longer, second distance from the skid plate; and
under the first operating conditions, aligning the vehicle in response to signals from the first sensors, the signals changing based on the positions of the first sensors relative to a plurality of conductive elements that are outside the vehicle and disposed along a conductive element axis.

14. A method of vehicle sensing, comprising:
under first operating conditions of a vehicle, emitting at least one first electrical field from a sensor system within a skid plate or a bumper of the vehicle;
under second operating conditions of the vehicle, emitting a second electrical field from the sensor system,
the first electrical field projecting a first distance from the skid plate, the second electrical field projecting a longer, second distance from the skid plate; and
activating a plurality of first sensors of the sensor system while at least one second sensor of the sensor system is inactive to emit a first electrical field from each of the first sensors, and activating the plurality of first sensors and the at least one second sensor to emit a second capacitive field.

15. The method of claim 13, wherein the plurality of conductive elements are disposed within a target that is placed on a floor of a parking area.

16. The method of claim 13, wherein the aligning includes aligning the vehicle such that a longitudinal axis of the vehicle is nominally perpendicular to the conductive element axis and aligning the vehicle laterally relative to the plurality of conductive elements.

17. The method of claim 13, wherein the aligning is autonomous.

18. The method of claim 13, further comprising detecting an object using the second electrical field, moving the vehicle closer to the object, and then detecting the object using the first electrical field.

19. The method of claim 13 further comprising emitting the at least one first electrical field and the second electrical field from the skid plate.

* * * * *